United States Patent
Wilcox

(10) Patent No.: US 6,571,562 B2
(45) Date of Patent: Jun. 3, 2003

(54) WITNESS DRAIN VALVE

(75) Inventor: David E. Wilcox, Gilbert, AZ (US)

(73) Assignee: Honeywell International Inc., Morristown, NJ (US)

(*) Notice: Subject to any disclaimer, the term of this patent is extended or adjusted under 35 U.S.C. 154(b) by 103 days.

(21) Appl. No.: 09/973,394

(22) Filed: Oct. 8, 2001

(65) Prior Publication Data
US 2003/0066293 A1 Apr. 10, 2003

(51) Int. Cl.$^7$ ............................................. F02G 3/00
(52) U.S. Cl. .................. 60/779; 60/39.094; 251/251; 251/349; 244/129.1
(58) Field of Search .................. 60/39.094, 779; 244/129.1, 135 R; 137/312, 313; 251/354, 349; 73/40, 40.5, 46, 49.1, 49.2

(56) References Cited

U.S. PATENT DOCUMENTS

| | | | |
|---|---|---|---|
| 2,814,931 A | * 12/1957 | Johnson | 30/39.094 |
| 3,233,616 A | * 2/1966 | Chieffo | 137/145 |
| 3,556,444 A | 1/1971 | Kopp | |
| 3,841,089 A | * 10/1974 | Clark | 60/39.094 |
| 4,057,364 A | * 11/1977 | Bratschitsch | 714/34 |
| 4,090,396 A | 5/1978 | O'Brien | |
| 4,423,595 A | * 1/1984 | McLean | 60/39.094 |
| 4,437,487 A | 3/1984 | Marmon | |
| 4,463,774 A | 8/1984 | Gorges et al. | |
| 4,506,851 A | 3/1985 | Gupta et al. | |
| 4,715,561 A | 12/1987 | Spinosa et al. | |
| 4,864,847 A | 9/1989 | Anderson et al. | |
| 4,972,700 A | * 11/1990 | Le | 73/40 |
| 5,127,222 A | * 7/1992 | Ream et al. | 60/204 |
| 5,170,659 A | 12/1992 | Kemp | |
| 5,263,314 A | * 11/1993 | Anderson | 60/39.094 |
| 5,285,636 A | 2/1994 | Mayo et al. | |
| 5,419,360 A | 5/1995 | Lechevalier | |
| 5,772,216 A | 6/1998 | Bredemeyer | |
| 5,996,938 A | 12/1999 | Simonetti | |
| 6,269,678 B1 | * 8/2001 | Geisinger | 73/1.05 |

* cited by examiner

Primary Examiner—Ted Kim
(74) Attorney, Agent, or Firm—Robert Desmond, Esq.

(57) ABSTRACT

For regulating engine exhaust and for environmental reasons, aircraft users are restricted from expelling engine fluids from engines onto airport ramps. All such fluid must be collected and subsequently burned or properly disposed of. The present invention installs witness drain valves in the drain lines between seal cavities and environmental collector tank. The witness drain valves have a small reservoir that will retain a known volume of fluid. As fluid passes from a leaking seal to the collector tank, a small sample is captured in the witness drain valve. Once the witness drain valve reservoir is full, the leaking fluid then flows on to a collector tank, which is also provided. During regular engine maintenance, technicians push on a spring loaded drain valve located on the witness drain valve reservoir. If fluid is detected, the seal is beginning to leak, and corrective maintenance may be scheduled while the leak rate is still within operational limits.

14 Claims, 4 Drawing Sheets

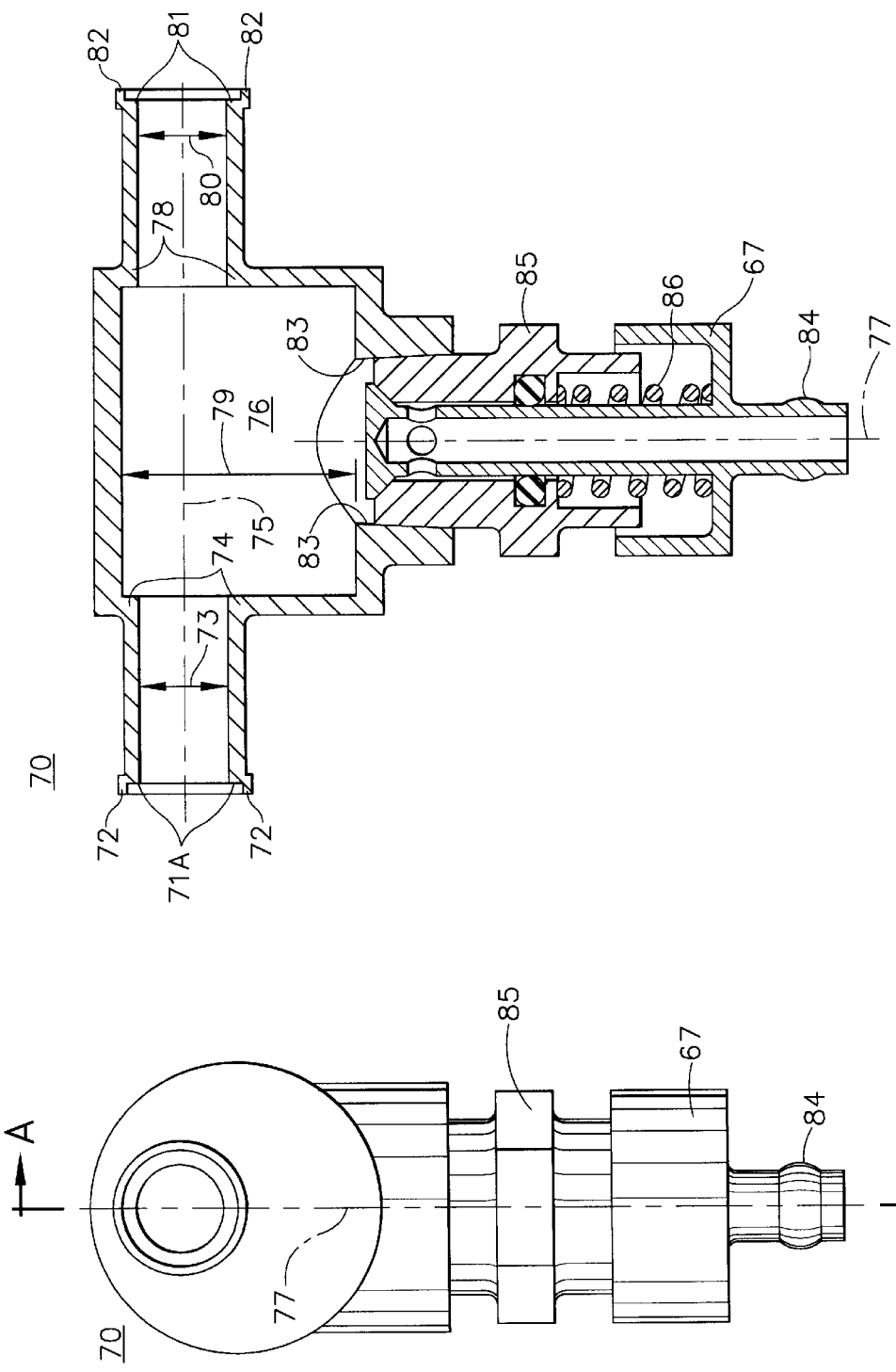

WITNESS DRAIN VALVE

BACKGROUND OF THE INVENTION

This invention relates to a fluid leakage detection system in a drain line. More particularly, the present invention integrates a commercially available finger push valve into a seal cavity leakage detection system placed inside an enclosed compartment, such as an aircraft engine or industrial machinery, providing a low-cost, non-intrusive means of early leak detection in a new or retrofit design. The method and apparatus disclosed in the present application provides an environmentally friendly alternative to other leak detection methods and improves reliability and maintainability.

Multi-joint hydraulic systems may have many fittings, which are not readily visible and thus are difficult to inspect on a routine basis. Sometimes minor leakage at such joints are not a problem for operations, therefore routine inspection is not necessary. In other applications, however, such as aerospace, high speed machinery, and transportation equipment, early leakage detection can be critical for operational and personnel safety. Quantifying leakage and leakage rate is necessary in order to distinguish between conditions which are allowable and those which are indicative of accelerated deterioration of a mechanical system. Therefore, a reliable, accurate, and fast determination of hydraulic system leakage can identify the need for maintenance and greatly improve prevention of catastrophic failures during operations.

Hidden-joints, while not visually accessible, are conventionally inspected by use of such devices as inspection mirrors. However, such efforts are subjective and non-quantitative. Often, visual inspection is not possible due to the compactness of the enclosed compartment and/or lighting conditions in the area of interest. Moreover, when portions of such hydraulic systems are thermally insulated, indirect observation is not possible and leak detection becomes a difficult, time-consuming, and critical task.

For environmental reasons, there is now a requirement that no engine fluids be expelled onto airport ramps. All such fluids, regardless of leakage source, must be collected, disposed of, or burned in the engine exhaust. Many gas turbine engines include an extensive drain system for transfer of fluid leakage to an interim storage area or reservoir outside the engine compartment. The storage area or reservoir provides a means for leakage detection. For example, one of the fluids that is expelled from an engine is leakage from an accessory drive seal. Before collector tanks were installed, fluid from a leaking seal cavity was routed to an overboard drain and could be observed dripping from the aircraft. That is the source of the term "witness drain". In such situations, technicians would note existence of the leak and would schedule corrective action to replace the leaking accessory seal. When collector tanks are used to capture the leaking fluid, there is no observable evidence to indicate that a seal is leaking, and the seal may continue to deteriorate until excessive oil loss is noted or other more serious operational symptoms develop. The problem is further complicated, for example, when collector tank drain lines are connected to a plurality of possible sources of joint and seal leakage. Typically, such drain lines are installed near oil, hydraulic or fuel seal points adjacent to moving elements, such as near gearboxes where other components are coupled to the engine via shafts passing through the gearbox housing. Other sources of leakage can be hydraulic actuators and fuel driven valves.

Traditionally, drain mast assemblies are installed in engines to satisfy the operational needs described above. Such drain systems provide an indication of leakage from a source to which the drain is connected but no indication as to the quantity or leakage rate of that source. In most commercial engine applications, operational drains drain away liquids that might accumulate during operation, and service drains collect liquids for removal during maintenance. Leakage associated with such service drains can be determined during maintenance by measuring the quantity of liquid collected. Typically, there are many drain lines feeding into the drain mast assembly, and for that reason, it is difficult to determine which particular drain line is leaking since the fluids tend to run onto adjacent drain lines. This disadvantage creates a problem for troubleshooting a leaking drain, and requires a time consuming investigation inside the nacelle and cowl assembly.

Prior art, U.S. Pat. No. 5,285,636, discloses an improved drain mast assembly having a plurality of collection chambers with each of the chambers coupled in liquid receiving relationship with a respective liquid drain line. The assembly allows identifications of individual drain lines having relatively high drain-rates. Each chamber in the improved assembly may include a transparent view window for visually determining the volume of liquid collected by the chamber. The valve in each chamber also includes a standpipe extending a pre-selected distance into the chamber for overflow draining of the chamber when the collected liquid exceeds a predetermined volume.

This patent essentially discloses a drain mast using a traditional overboard method to dispose of the leakage waste fluids. Once the drain mast fluid leak detection collection chamber is filled, the fluid is expelled from the aircraft. The system requires that the valve and standpipe be integrated within a compact space. This is to avoid creating an excessively large drain mast causing aerodynamic drag for the aircraft. The standpipe height determines the volume of the fluid retained in the detection chamber before being drained overboard, thus significantly complicating the design. Since the system focuses on use of the drain mast concept and is located outside the engine cowling, there is a resulting requirement to incorporate special design features, such as mountings, that must take aerodynamic effects into consideration. This makes the system expensive, heavy, difficult to maintain, and not retrofitable.

Therefore, there is a need for a cost-effective, accurate, safe, reliable, and efficient witness drain system, using commercially available components, to meet regulatory and environmental considerations and to allow for inspection and quantification of drain line leakage.

SUMMARY OF THE INVENTION

The present invention provides an apparatus and method to conveniently and accurately checks drain line leakage. The apparatus and method disclosed is lightweight, usable for both new and retrofit designs, inexpensive, and does not affect aerodynamic drag.

In one aspect of the present invention, a commercially available finger push valve is integrated into a witness drain valve system allowing excessive fluid in a drain line to continue along its original route. Disclosed is an apparatus comprised of a witness drain valve having a small built in reservoir that retains a small, predetermined portion of leaking fluid along the drain line. The apparatus can be installed in the drain line between the seal cavity and the environmental collector tank. As the fluid passes the leaking seal to the collector tank, a small sample is captured in the apparatus. Once the reservoir of the apparatus is full, the leaking fluid flows on to the collector tank as intended. The apparatus is non-intrusive and provides critical leakage information to engine maintenance crews. No standpipe is required nor is there a need for an overboard drain to dispose of waste fluid.

In another aspect of the present invention, a method of improving engine reliability and maintainability is disclosed. The method comprises the steps of: installing an improved witness drain valve having variable diameters along the fluid flow path to create a small reservoir of pre-designed volume appending the drain line; disposing the drain witness valve between the leaking seal and environmental collector tank; flowing fluid along the drain line; collecting a leakage fluid sample; inspecting leakage fluid amount through a commercially available finger push valve connected to the witness drain valve perpendicular to the flow direction; determining the need for maintenance of the seal; and scheduling maintenance as required before further seal deterioration occurs. The pre-designed volume may be determined during the design phase by calculating allowable leakages in seal cavity drains based on the maintenance needs of individual engines or operations. This approach is distinguishably different from the prior art which is generally based on the volume of the reservoir being primarily determined by the size of the stand pipe and geometric considerations for reducing aerodynamic drag. By individualizing the drain line cavity volume based on criticality of leakage of each individual seal, the various reservoir volumes can be maximized to realize a system reliability improvement by tailoring the maintenance need of each drain line in the system.

In yet another aspect of the present invention, there is disclosed a decentralized witness drain valve system comprised of a series of witness drain valves installed along drain lines to accurately determine the leakage amount and leakage rate at each specific drain line. Each witness drain valve incorporates a predetermined reservoir volume and a commercially available finger push valve. The system provides information on leakage amount and rate by determining, by means of the finger push valves, which reservoir has filled between consecutive inspections. The quantitative leakage assessment provides information on seal deterioration rate, and thus improves engine operational safety.

These and other features, aspects and advantages of the present invention will become better understood with reference to the following drawings, descriptions and claims.

BRIEF DESCRIPTION OF THE DRAWINGS

FIG. 3 is an elevational view of a witness drain valve in the flow direction according to one of the embodiments of the present invention; and FIG. 4 is a cross sectional view taken along lines A—A of FIG. 3 depicting one embodiment of the present invention.

DETAILED DESCRIPTION OF THE INVENTION

Figure 1:
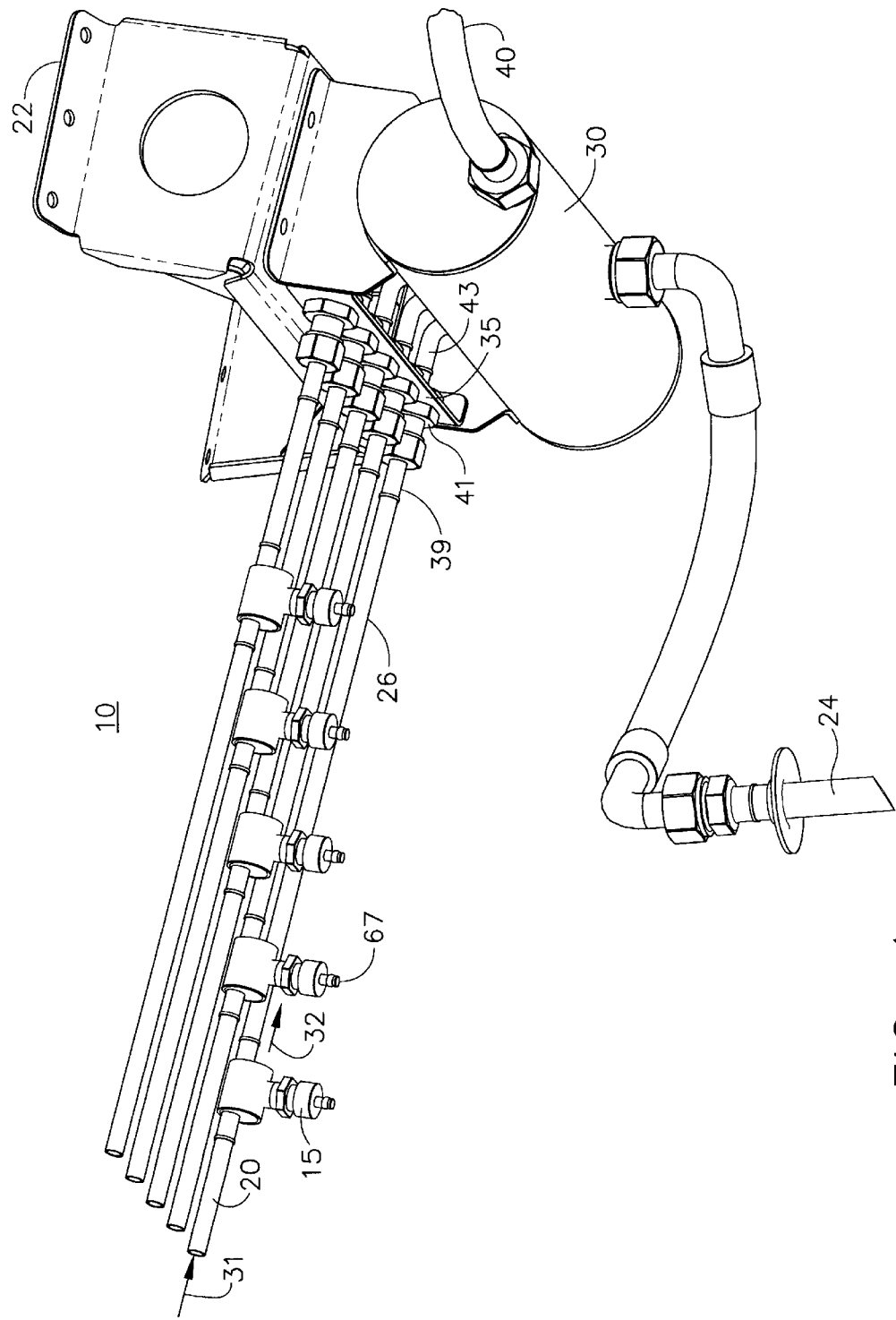
FIG. 1 is a perspective view of an engine drain line and collector tank system with witness drain valve applications as conceived by the present invention.
Figure 1A:
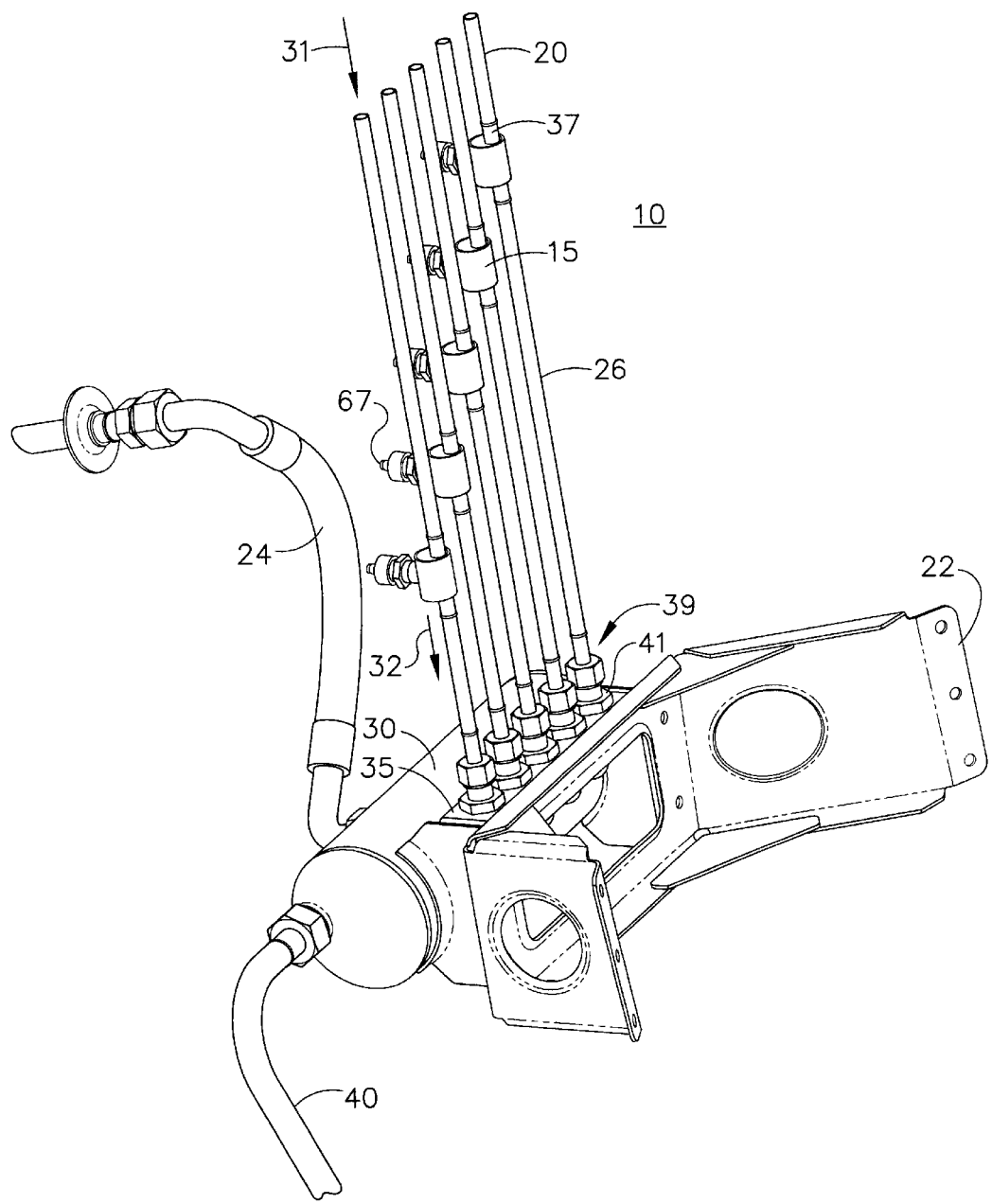
FIG. 1a is another perspective view of an engine drain line and collector tank system as in FIG. 1 showing flow interface details.

Referring to FIGS. 1 and 1a, there are shown perspective views of a drain system 10 in an engine compartment as conceived by the present invention. The system includes multiple drain lines comprising upstream drain lines 20 and downstream drain lines 26. Witness drain valves 15 are interposed between the upstream drain lines 20 downstream drain lines 26. The upstream drain line 20 is connected to the inlet end of the witness drain valve by means of conventional hydraulic interface connections, such as threaded, swaged, or brazed. Similarly, the outlet end of the witness drain valve is connected to the downstream drain line 26. The third leg of the witness drain valve 15 may be connected to a finger push valve 67. At the interface of the witness drain valve 15 and finger push valve 67, a hydraulic connection, such as a threaded or snap connector may be used to form a sealed junction between the drain valve 15 and finger push valve 67. The third leg of the witness drain valve 15 is typically located in the vertical direction perpendicularly to the flow line formed by the connections between upstream drain lines 20, witness drain valve 15, and downstream lines 26, and generally points in the direction of gravity downward for proper function of the finger push valve 67.

The witness drain valves 15 are shown in a functional configuration in FIGS. 1 and 1a. The functional aspects of the drain system in an engine compartment are shown during operation, and illustrate how the upstream drain line 20 is connected to a seal cavity (not shown) further upstream. As fluid starts leaking from the seal cavity, it flows down the upstream drain lines 20 toward the witness drain valve 15 forming the in-flow leakage stream 31. Upon entering the inlet end 37 of the witness drain valve 15, the fluid starts accumulating in the pre-designed cavity volume formed inside the witness drain valve 15, generally defined by the interfaces between the upstream drain line 20, downstream drain line 26 and finger push valve 67. During normal operations as generally perceived by the present invention, the in-flow leakage stream 31 will begin filling the pre-designed cavity volume inside the witness drain valve 15 before there is flow to the downstream drain line 26. During normal operation, before the pre-designed cavity inside the witness drain valve fills, the downstream drain line 26 remains practically dry. The accumulation of in-flow leakage stream 31 in the pre-designed cavity volume may be generally located on the upstream side of the connector of the finger push valve 67. Since the in-flow leakage stream 31 is first captured in the pre-designed cavity volume inside the witness drain valve 15 before it flows further downstream, the engine maintenance crew, during routine maintenance, may identify the first sign of leakage from a particular seal cavity by using the finger push valve 67 to check if there is any accumulation in the pre-design cavity inside the witness valve 15. When there is no accumulation inside the cavity of the witness drain valve 15 when the finger push valve is operated, it indicates a good sealing condition in the drain line and seal cavity. For minor leakage constituting insufficient fluid to fill the entire inside cavity during periods between two consecutive engine inspections, the total volume of the accumulated fluid inside the pre-design cavity volume inside the witness drain valve 15 can be drained out from the finger push valve 67. The drained out volume can then be measured to be less than the pre-designed cavity volume. By quantifying the leakage volume during a known period, maintenance crews are provided with the necessary information to determine the seriousness of the leakage and aid in determining if maintenance is needed on a particular seal cavity.

When the in-flow leakage stream 31 is at a high enough rate to fill the pre-designed cavity inside the witness drain valve 15 during two consecutive inspection periods, the in-flow leakage stream overflows the inside cavity completely and continues toward the connection of the downstream drain line 26. The over-flow forms a downstream leakage stream 32 in the direction of the downstream drain line 26. The downstream leakage stream 32 flows generally in the direction of the in-flow leakage stream 31, thus, the witness drain valve 15 does not interfere or change the course of the leakage flow when interposed between the upstream drain line 20 and the downstream drain line 26. This over-flow feature as conceived by the present invention overcomes some of the design and operational difficulties of prior art involving over board drain methods. This feature also eliminates the need for a standpipe or mast for centralized fluid leakage accumulation.

It should be obvious to those skilled in the art that the pre-designed cavity inside the witness drain valve 15 can be tailored for individual seal cavities. For example, a critical seal may be designed with a small inside cavity volume within a witness drain valve so that the cavity will be filled quickly upon the reception of a small in-flow leakage stream 31 in a short period of time. The overflow in the inside cavity may indicate to the engine inspection crew that there is a need for maintenance. A different size cavity inside the witness drain valve can be used for a second drain line and seal corresponding to its leakage criticality. A complete drain system 10 as shown in FIGS. 1 and 1a may have several different drain lines with several different sizes of witness drain valves. In one of the embodiment of the present invention, the witness drain valves in a single drain system may have completely different inside cavity volumes depending on the different leakage rates of different seal cavities which are inspected on a routine basis. The drain system 10, as conceived in the present invention, permits individual tailoring of different drain lines based on the respective criticality of seal cavities, thus, significantly increasing maintainability and reliability characteristics of engine operations. Additionally, this feature of the present invention surpasses prior art designs from the standpoint of safety and operational costs.

In yet another embodiment of the present invention, witness drain valves 15 are connected downstream of drain lines 20 which are downstream from leaking seals cavities (not shown) within an engine compartment (not shown). The witness drain valves 15 are connected upstream of drain lines 26 which are up stream of a collector tank 30. The connection between the downstream drain line 26 and the collector tank 30 may be by means of typical hydraulic interface connections such as threaded, swaged, or brazed. The drain line connector 39 connects the downstream drain line 26 to a drain line coupler 41 that is in communication with a drain line coupler panel 35. The drain line coupler panel 35 hosts a series of drain line couplers 41 providing connections to all the drain lines that maintain flow communication with the collector tank 30. On the back side of the drain line coupler panel 35, a series of tank interface lines 43 may be provided to flow the leakage streams into the collector tank 30.

The collector tank 30 may be connected to an exhaust ejector line 40 for burning the waste fluid in the engine exhaust, a ground serviceable waste tank connection 24 and an overboard drain mast (not shown) to flow waste fluid to an external environment. The collector tank 30 may be mounted inside an engine compartment (not shown) within cowling (not shown) through a typical mounting bracket 22 with fasteners to an interface wall of an engine. As conceived in the present invention, the drain system 10 as shown in FIGS. 1 and 1a fits inside an engine cowling, thus avoiding the external exposure of a traditional drain leakage device. This characteristic of the present invention results in an aerodynamic drag reduction of as much as eight times or more in comparison to traditional systems. Because the drain system 10 may be completely inside the engine, one optional configuration is to install the witness drain valves 15 in close proximity to a maintenance door. This allows technicians to check for cavity drain leaks during engine service when the cowl is opened for other engine related tasks.

Again referring to FIG. 1, each drain line 20 may be in flow communication with one of the witness drain valves 15. In accordance with the present invention, the drain lines 20 may be connected to various locations within the engine where different kind of liquids, for example, hydraulic, oil and fuel, may accumulate. These liquids are drained away from accumulation areas, and either collected to determine the volume of leakage, or piped to collector tank 30 and then to exhaust ejector line 40, or to an external environment through an overboard drain mast (not shown). This alternative option of flowing out the waste fluids to and through exhaust ejector line 40, ground serviceable waste tank connection 24, or overboard drain mast (not shown) is critical in the present invention because leakage of fluids has become an important issue in the design and certification of aircraft, both commercial and military. Regulators and operators are requiring that engine installations contend with the waste fluids without polluting the environment. These requirements are fully satisfied by the design features as conceived by the present invention.

Figure 2:
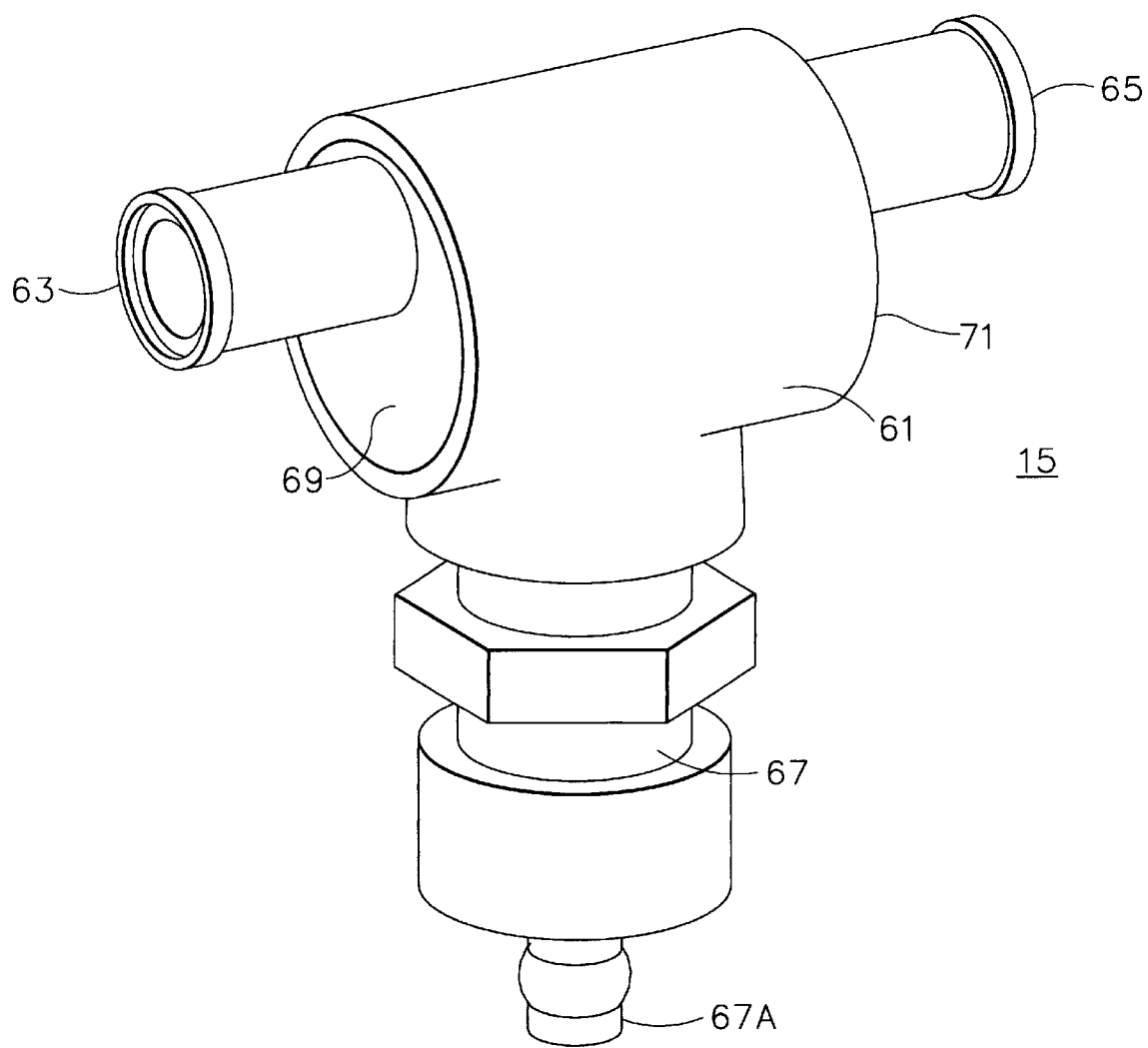
FIG. 2 is a representative view of the general assembly of a witness drain valve construction according to one of the embodiments of the present invention.

Referring now to FIG. 2, there is shown an enlarged view of the witness drain valves 15 of FIG. 1. In one embodiment, the witness drain valve construction may be comprised of a larger diameter reservoir 61 with drain connections 63 and 65 on both ends. A commercially available finger push valve 67 may be attached to the bottom of the reservoir 61. As leakage liquids flow in from the first drain line connection 63 to the reservoir inlet end 69, the leakage liquid start accumulating in the predetermined internal volume within reservoir 61. Once the internal volume of reservoir 61 is full, the fluid continues along its original route by exiting from the outlet end of the reservoir 71 onto the second drain line connection 65, and then toward the downstream collector tank 30 shown in FIG. 1. The addition of a witness drain valve to a drain line between a leaking seal and the collector tank does not alter the flow of waste fluid, nor does it create a need for other modifications in the existing engine drain system. The use of the present invention is thus non-intrusive and non-interrupting to a new or existing drain system design, making it fully adaptable to being retrofitted on an existing system with the objective of improving system reliability. In one of the embodiment of the present invention, the witness drain assembly can be a simple, retrofittable, improvement to an existing engine drain system. This will become more apparent as details of the witness drain assembly are further described below.

As shown in FIG. 2, the witness drain valve 15 has no need for a stand pipe since it overflows at the top of the internal volume of the reservoir 61 instead of the bottom as required with a drain mast. This feature allows use of a commercially available valve instead of a customized standpipe valve. Elimination of the standpipe requirement is also beneficial in that there is no need to design a unique compact space to avoid excessively large aerodynamic drag. Also, since the witness drain valve 15 is situated inside the engine cowling, physical size and shape requirements may be much less restrictive.

Referring further to FIG. 2, the finger push valve 67 can be used to drain the accumulated fluids when necessary by pushing the spring loaded end 67A at the bottom end of the finger push valve. Finger push valves 67 are commercially available standard parts, most commonly used for aircraft fuel system sump drains. Flight crews normally open those valves and use a transparent recipient to inspect for water condensation in the fuel tank. The same process may be followed in the present invention to determine the amount of accumulated fluids, types of fluids, and in some instances the rate of waste fluid accumulation. Integration of commercially available finger push valves 67 into the witness drain valve 15 system provides a low cost engine diagnostics approach, improves maintainability of the witness drain valve system by the use of readily available commercial replacement parts, and enhances engine operational safety by detecting abnormally excessive leakage of draining fluid.

FIG. 3 is an elevational side view of one embodiment of the present invention. FIG. 4 is a cross-sectional view, taken along section lines A—A of FIG. 3, to further depict details of the present invention. The witness drain valve 70 may be comprised of a flow channel with variable diameters along the flow direction. The first diameter at the upstream end 71A of the flow channel provides the interface to the upstream drain pipe (not shown) connected to a plurality of leaking seals/fittings (not shown). The drain fluids enter the witness drain valve 70 through the upstream end 71A. A first circumferential shoulder 72 may be provided for the flow transition into a second diameter 73 of the witness drain valve 70 in the downstream direction. The first circumferential shoulder 72 reduces the flow channel cross section to allow a seal (not shown) to be positioned against the first circumferential shoulder 72 when connecting the witness drain valve 70 to the upstream drain pipe (not shown). The diameter of the flow channel further changes as it proceeds to the downstream end. The transition to larger diameter may be accompanied by a second circumferential shoulder 74 then a third diameter 79, generally larger than the second diameter 73. The larger third diameter 79 creates a chamber or cavity 76 toward the longitudinal center 77 of the witness drain valve 70. The cavity 76 may be primarily located below the axial flow centerline 75 of the drain leakage flow. A third diametric transition occurs along the flow direction toward the downstream end. This third transition may be accompanied by a third circumferential shoulder 78 which effectively reduces the flow channel toward the downstream direction producing a fourth diameter 80 along the flow channel. A fourth diametric transition at the downstream end of the witness drain valve 70 may be accomplished by a fourth shoulder 81 at the downstream end 82. Fourth shoulder 81 provisionally provides a seat for connecting the witness drain valve 70 and downstream drain valve (not shown) which may be connected to a collector tank 30, shown in FIG. 1.

Still referring to FIG. 4, at the bottom of cavity 76, a commercially available finger push valve 67 may be attached along the longitudinal direction. A hollow bolt 84 and a housing 85 are inserted through the top of opening 83 of cavity 76. The hollow bolt 84 may be pre-loaded by means of a spring 86. The housing 85 may be secured to the interior circumferential wall of opening 83. As the fluids flow through cavity 76, it begins to accumulate at the bottom portion of said cavity 76. The bottom portion of cavity 76 also corresponds to the top of the opening 83 and the upper end of hollow bolt 84. When the spring loaded hollow bolt 84 is pushed, the accumulated fluids are drained out of the cavity providing a quick and accurate way to determine the amount of leakage, types of leakage and rate of leakage. FIG. 4 further illustrates how the finger push valve 67 interfaces with the witness drain valve 70. The finger push valve can be secured via thread engagement to top of opening 83 at the bottom portion of cavity 76 according to one embodiment of the present invention. The witness drain valve 70 variable diameter flow channel as shown in FIG. 4 may be a single component manufacture using a process such as metal forging or injection molding to produce a low-cost product.

Although the present invention has been described in considerable detail with reference to certain versions thereof, other versions are possible. Therefore, the spirit and scope of the appended claims should not be limited to the description of the versions contained therein.

We claim:

1. A witness drain valve for an engine, said witness drain valve being disposed in a drain line between a seal cavity and a collector tank comprising:
   a flow channel with variable diameters along an axial direction having an upstream end and a downstream end at opposite sides in said axial direction;
   a first interface means at said upstream end to connect to an upstream drain line having an up stream flow center line;
   a second interface means at said downstream end to connect to a downstream drain line having a downstream flow center line;
   a cavity serving as a fluid reservoir formed within said flow channel by said variable diameters in said axial direction wherein said cavity having a predetermined volume inside said witness drain valve and a bottom end away from said upstream flow center lines;
   said predetermined volume of said cavity being substantially below said upstream flow centerline or said down stream flow center line whichever is further;
   an opening at said bottom end of said cavity; and,
   a commercially available finger push valve inserted into said cavity through said opening.

2. A witness drain valve as in claim 1 further comprising:
   a vacuum ejector in flow communication with said collector tank further downstream from said witness drain valve.

3. A witness drain valve as in claim 1 further comprising:
   an overflow drain mast in flow communication with said collector tank further downstream from said witness drain valve.

4. A witness drain valve as in claim 1 further comprising:
   a ground serviceable waste tank in flow communication with said collector tank further downstream from said witness drain valve.

5. A witness drain valve apparatus for an engine for reducing aerodynamic drag comprising:
   a flow channel with variable diameters along an axial direction having an upstream end and a downstream end at opposite sides in said axial direction;
   a first interface means at said upstream end to connect to an upstream drain line having an up stream flow center line;
   a second interface means at said downstream end to connect to a downstream drain line having a downstream flow center line;
   a cavity serving as a fluid reservoir formed within said flow channel by said variable diameters in said axial direction wherein said cavity having a predetermined volume inside said witness drain valve and a bottom end away from said upstream flow center line;

said predetermined volume of said cavity being substantially below said upstream flow centerline or said down stream flow center line whichever is further;

an opening at said bottom end of said cavity;

a commercially available finger push valve inserted into said cavity through said opening; and, furthermore said apparatus is situated completely inside an engine cowling.

6. An apparatus for assessing engine maintenance needs by checking fluid accumulations in a plurality of valves, comprising:

a plurality of drain lines attached to a plurality of sealed fitting drain locations in an engine;

said plurality of valves being identical in number to said plurality of drain lines;

each of said drain lines connecting to one of said valves where said valves are located at close proximity to maintenance access doors of said engine to be accessible when opened, and furthermore each of said valves further comprising a finger push fitting for draining leakage fluids accumulated therein;

a plurality of flow channels connecting said valves to a storage tank for the purpose of collecting overflow fluids from said valves;

said storage tank including a mounting bracket for interfacing with engine walls; and said storage tank further including a drain pipe connection for discharging fluids collected inside said tank.

7. An apparatus as in claim 6 further comprising an exhaust ejector line linking said storage tank to an engine burn means for discharging and burning said fluids collected inside said storage tank.

8. An apparatus as in claim 6 further comprising a decentralized architecture for said apparatus allowing individual tailoring of said valves based on leakage criticalities of said fitting drain locations.

9. An apparatus as in claim 8 wherein said valves being flow-over accumulators interposed along said drain lines between said collector tank and said fitting drain locations.

10. A method of improving the engine reliability and maintainability comprising:

installing an improved witness drain valve having variable diameters along a fluid flow direction wherein the variable diameters create a small reservoir appending to a drain line;

disposing said drain witness valve between a leaking seal and a environmental collector tank;

flowing waste fluids along said drain line;

collecting leakage fluid samples;

inspecting leakage fluid amount through a commercially available finger push valve connected to said witness drain valve perpendicular to the flow direction;

determining needs of maintenance on the seal; and, scheduling maintenance as required before further seal deterioration.

11. A method of improving the engine reliability and maintainability as in claim 10, further comprising the steps of:

discharging said waste fluids to said environmental collector tank;

draining said waste fluids from said environmental collector tank to a vacuum ejector; and, burning said waste fluids in an engine exhaust through said vacuum ejector.

12. A method of improving the engine reliability and maintainability as in claim 10, further comprising the steps of:

discharging said waste fluids to said environmental collector tank; and, draining said waste fluids from a drain mast wherein said drain mast is connected to said environmental collector tank further downstream.

13. A method of improving the engine reliability and maintainability as in claim 10, further comprising the steps of:

discharging said waste fluids to said environmental collector tank; and, draining said waste fluids to a ground serviceable tank said ground serviceable tank being connected to said environmental collector tank further downstream.

14. A method of simply and accurately determining leakage amount, leakage rate and type of leakage in a engine system comprising:

installing a plurality of improved witness drain valves wherein each said valve includes variable diameters along a fluid flow direction wherein the variable diameters create a small reservoir appending to a drain line;

disposing each of said drain witness valves between a corresponding leaking seal and an environmental collector tank;

flowing waste fluids along said drain lines;

collecting leakage fluid samples from each of said witness drain valves;

inspecting leakage fluid amount through a commercially available finger push valve connected to said witness drain valve perpendicular to the flow direction;

determining total amounts of fluids in each corresponding drain line; and, identifying leakage type by collecting corresponding fluids at different drain areas.

* * * * *